Jan. 30, 1968
K. V. CUSHMAN
3,365,851
PANEL STRUCTURE AND EDGING MEANS GRIPPING AN
EMBEDDED PANEL LOCKING MEANS
Filed Feb. 5, 1965
3 Sheets-Sheet 1
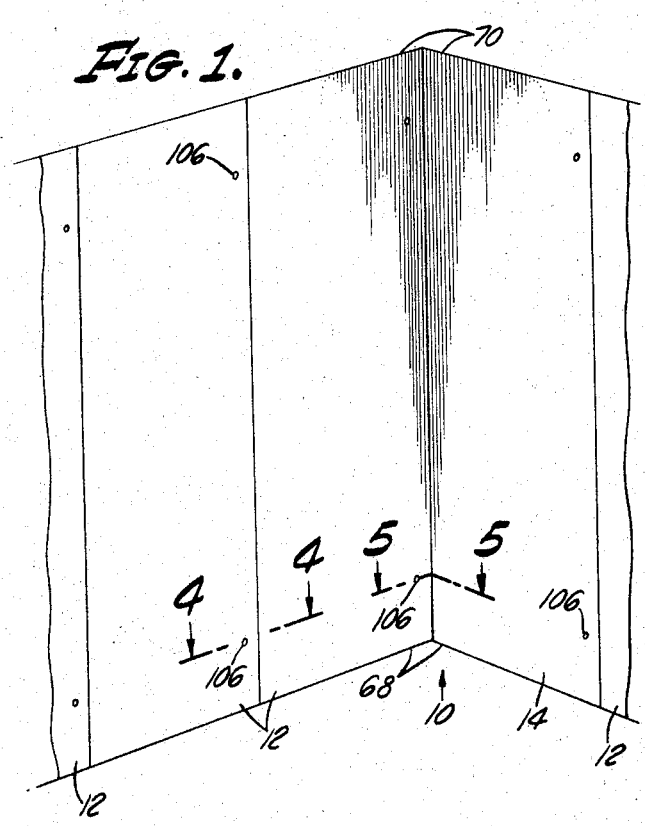
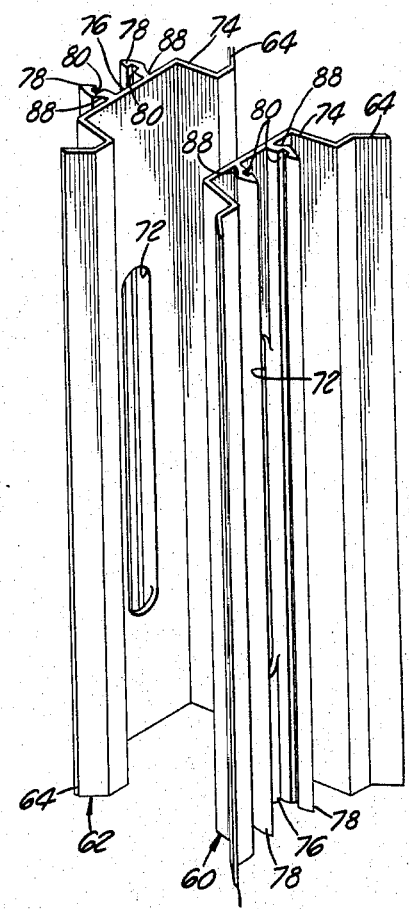
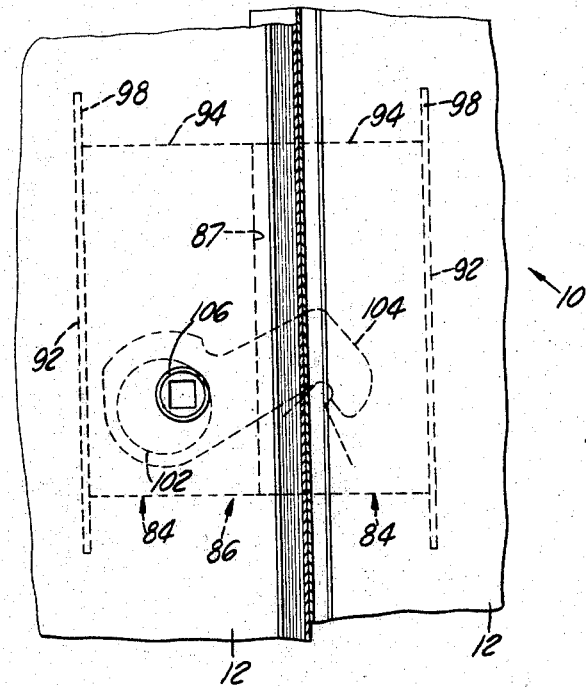
INVENTOR.
KENNETH VANTINE CUSHMAN
BY Herzig & Walsh
ATTORNEYS Jan. 30, 1968  K. V. CUSHMAN  3,365,851
PANEL STRUCTURE AND EDGING MEANS GRIPPING AN
EMBEDDED PANEL LOCKING MEANS
Filed Feb. 5, 1965  3 Sheets-Sheet 2
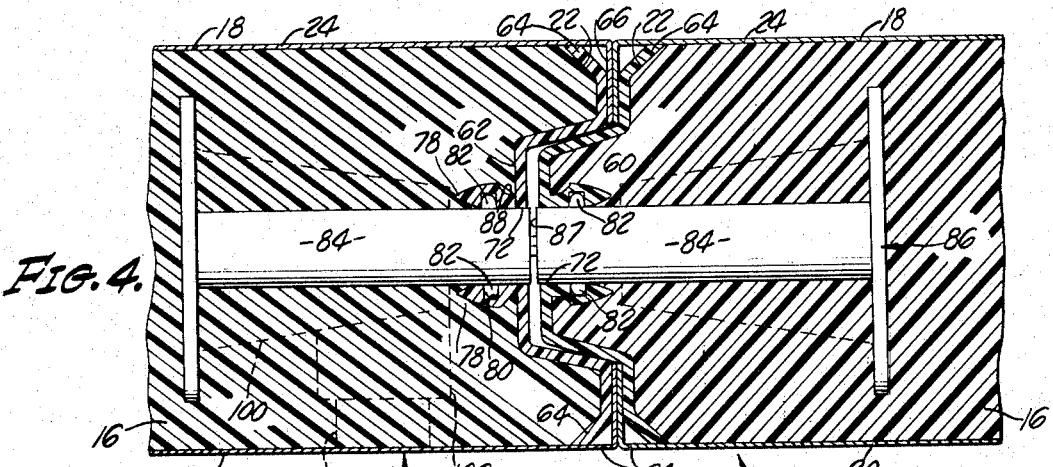
FIG. 4.
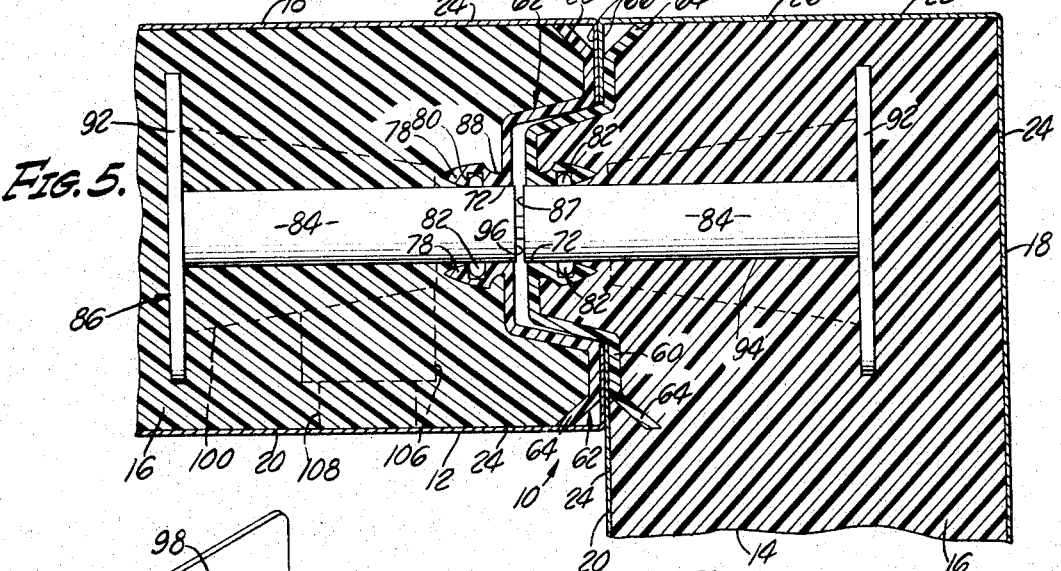
FIG. 5.
FIG. 7.
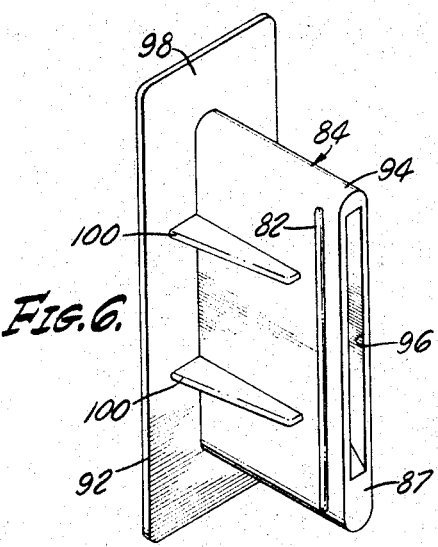
FIG. 6.
INVENTOR.
KENNETH VANTINE CUSHMAN
BY
Herzig & Walsh
ATTORNEYS Jan. 30, 1968     K. V. CUSHMAN     3,365,851
PANEL STRUCTURE AND EDGING MEANS GRIPPING AN
EMBEDDED PANEL LOCKING MEANS
Filed Feb. 5, 1965     3 Sheets-Sheet 3
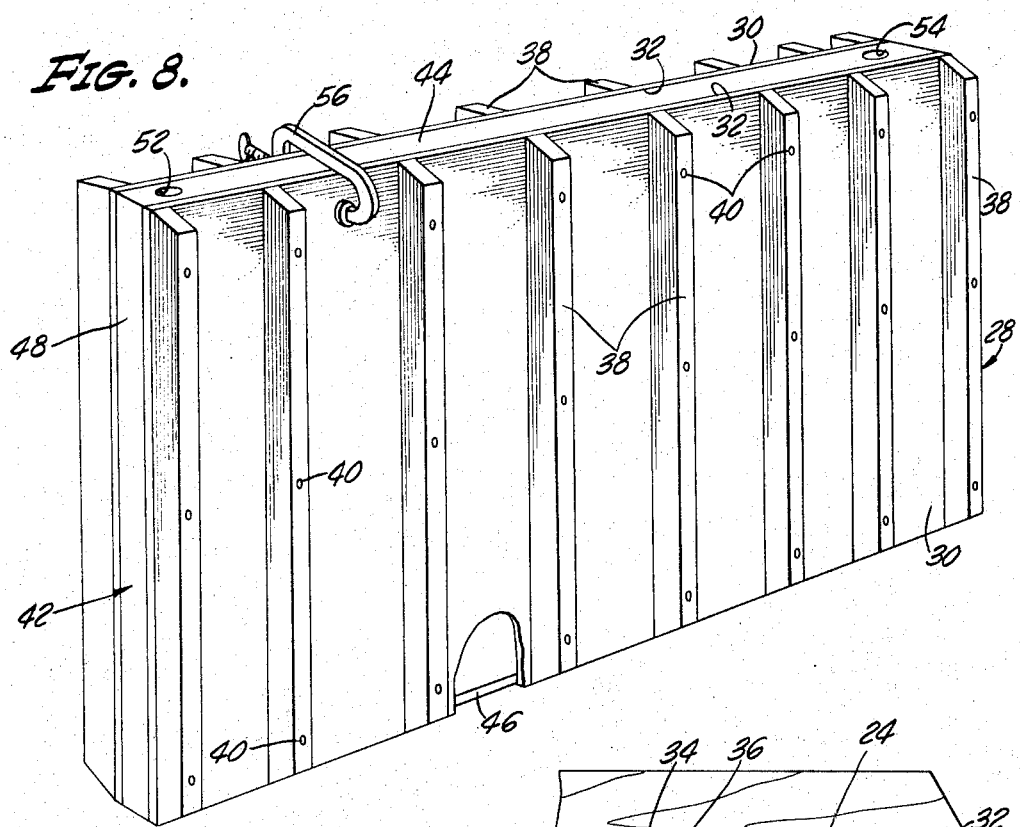
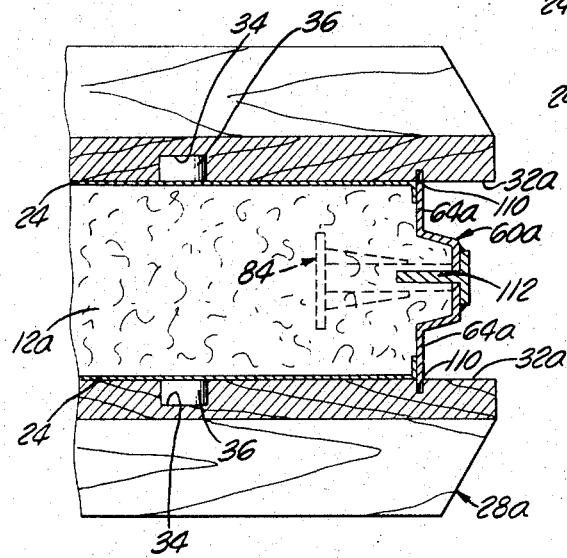
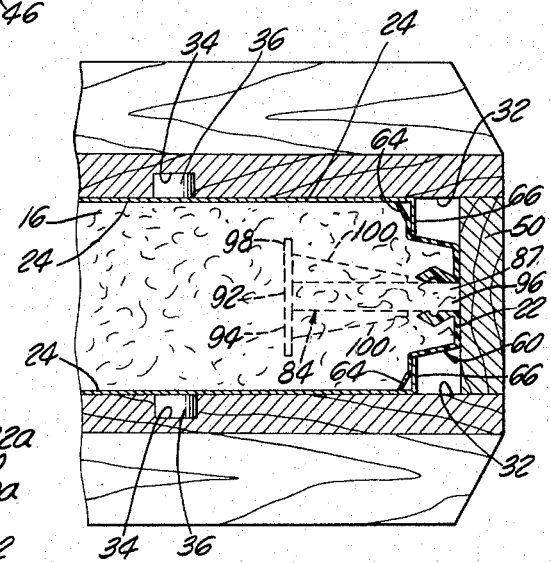
INVENTOR.
KENNETH VANTINE CUSHMAN
BY Herzig & Walsh
ATTORNEYS

United States Patent Office 3,365,851
Patented Jan. 30, 1968

3,365,851
PANEL STRUCTURE AND EDGING MEANS GRIPPING AN EMBEDDED PANEL LOCKING MEANS
Kenneth Vantine Cushman, Santa Ana, Calif., assignor to The Delron Company, Inc., Santa Ana, Calif., a corporation of Nevada
Filed Feb. 5, 1965, Ser. No. 430,693
12 Claims. (Cl. 52—580)

ABSTRACT OF THE DISCLOSURE

The invention is concerned with improvements in panels of the type that can be fastened together for the purpose of erecting structures from them. The panels may be of molded construction. The panels are formed from moldable materials, the panels having flat skin sheets on the outside and molded edge members. The panels are attachable together by way of latching or locking members provided in housings that are mounted, that is, molded within the panels in a position so that the locking means or members are at the edges of the panels in position to cooperate with each other. The particular improvements of this invention provide for forming slots in the edge members of the panels with means for attaching or mounting the housings of the locking members directly to the edge members adjacent the slots. Preferably the locking housings are provided with ribs that are engaged by extending projections which straddle the slots in the edge members. In this manner the housings of the locking members can be mounted to or attached to the edge members and molded in place when the panels are fabricated.

---

The present invention relates to a new and useful panel structure and edging means and more particularly to such a means for a foamed-in-place panel.

In a co-pending application, Ser. No. 430,394 filed Feb. 4, 1965 by the applicant herein, there is described and claimed a totally enclosed clamp means or locking mechanism for locking the joining surfaces of a pair of panels or wall members together. This locking mechanism includes two separate casings or housings. A latch is mounted in one of the housings and a locking member and cam assembly is rotatably mounted in the other housing. Each housing assembly includes a closed end forming a bracket and an open end.

The present invention relates to a totally enclosed clamp means or locking mechanism of the type described in said co-pending application which includes means coacting with panel-edging means which not only retain the clamp means in position within a mold during the molding of foamed-in-place panels, but which also forms a new and useful panel edging for the completed molded panel.

Accordingly, it is the primary object of the present invention to provide a new and useful totally enclosed panel clamp in combination with a new and useful panel edging for a foamed-in-place panel.

Another object of the present invention is to provide a new and useful totally enclosed panel clamp of the type described in said co-pending application which includes means engageable with a panel edging of the present invention to retain the panel clamp in position within a mold during the formation of foamed-in-place panels.

Yet another object of the present invention is to provide a new and useful panel edging for foamed-in-place panels.

A further object of the present invention is to provide a panel edging device for foamed-in-place panels including flexible holding flanges centered on its inside surface for providing gripping means to retain the edging in position on a foamed-in-place panel, for providing gripping means to grip the housing of a totally enclosed panel clamp to retain the housing in position during the molding operation and to form, in cooperation with the housing, a reinforcement for the edging to prevent it from pulling out of the finished panel.

According to the present invention, a totally enclosed panel clamp of the type disclosed in said co-pending application is provided with means for cooperating with flexible holding flanges centered on the inside surface of a panel edging used to reinforce the edge of a foamed-in-place panel.

Although the panel edging will be disclosed and described herein as constituting an extruded, plastic section having a self-holding device which cooperates with the housing of the clamp of the present invention and which also constitutes means which become embedded in the molded edge of the panel to securely affix the extruded section to the panel, it is to be understood that the panel edging may take other forms such as metal roll-formed sections and the like.

Any tongue-and-groove shape could incorporate the holding flanges of the present invention with an elongated slot being stamped by punch press at predetermined locations to receive the clamp housing.

The housing of the panel clamp of the present invention is affixed to the panel edging prior to forming the foamed-in-place panel by merely squeezing the sides of the extrusion to open the inner flanges thereof for engagement with the housing of the panel clamp as it is positioned in the elongated slot. Alternatively, direct pressure may be applied to the housing to snap it in place in between the holding means on the panel edging section. Raised ribs are provided on each side of the housing to minimize the possibility of the pulling away of the panel edging from the clamp. Although the present invention is described for the purposes of illustration, but not of limitation, as including a plastic housing having raised ribs, it is to be understood that a metal version could be accomplished by forming small ears from the parent metal in both sides of a steel bracket, or the like.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in several views.

In the drawings:

FIGURE 1 is an elevational view of a plurality of foamed-in-place panels incorporating features of the present invention;

FIGURE 2 is an enlarged elevational view showing a panel clamp of the present invention in phantom in cooperation with a foamed-in-place panel and a panel edging of the present invention;

FIGURE 3 is a perspective view of mating sections of the panel edging of the present invention;

FIGURE 4 is an enlarged, cross-sectional view taken along line 4—4 of FIGURE 1;

FIGURE 5 is an enlarged cross-sectional view taken along line 5—5 of FIGURE 1;

FIGURE 6 is a perspective view of a housing for a panel clamp of the present invention;

FIGURE 7 is an enlarged, partial cross-sectional view showing the relationship of the panel edging of the present invention and a housing of the present invention during the assembly step of connecting the two members together;

FIGURE 8 is a perspective view of a mold for forming a foamed-in-place panel employing the clamp and edging of the present invention;

FIGURE 9 is a partial, cross-sectional view showing the clamp and edging of the present invention in use in a mold; and FIGURE 10 is a cross-sectional view similar to FIGURE 9 of a prior art panel and molding means.

Referring again to the drawings, a wall member 10 includes a plurality of straight wall sections 12 and a corner section 14. Each of the panel sections 12 and 14 includes a foamed-in-place core 16 having an outside surface 18, an inside surface 20, and an edge surface 22. The surfaces 18 and 20 of the panels 12 and 14 are reinforced by suitable skin members 24 and the edge 22 of the corner panel 14 is reinforced with a skin member 26 which may be conveniently formed by bending an extension formed on the skin member 24 for the outside surface 18 of the panel 14 over at right angles.

The panels 12 and 14 may be conveniently made in suitable molds, such as the mold 28 shown in FIGURE 8 for making the panels 12. The mold 28 includes a pair of upstanding, spaced parallel panels 30 which may be conveniently made from plywood sheets and which include inner faces 32 provided with vertical recesses 34 in which permanent magnets 36 are mounted. The magnets 36 may be spaced along the panels 30 on suitable centers such, for example, as 12″ and serve to tightly adhere the skin members 24 to the panels 30. The panels 30 are preferably reinforced with upstanding 2 x 4 members 38 which are secured to the panels 30 at spaced intervals therealong by screws 40. The panels 30 are maintained in spaced relation by a spacer member 42 having an upper rail 44, a bottom rail 46, a first end rail 48, and a second end rail 50. The top rail 44 is provided with a first aperture 52 through which liquid foam may be injected to form the core 16 of the panel 12 and a second aperture 54 comprising an air vent. The panels 30 may be tightly clamped together by suitable clamps, such as the C-clamp shown at 56, which may be uniformly spaced around the mold 28.

After the skin members 24 are positioned on the panels 30, a suitable panel edging device, such as a first panel edging or extruded plastic tongue 60 may be placed in one end of the mold 28 and a second panel edging or extruded plastic groove 62 may be placed in the other end of the mold 28 by engaging flanges 64, which are provided on the edging devices 60 and 62. Behind the inturned edges 66 of the skin members 24, a panel edging of the type shown at 60 may also be employed when molding the panel 14. However, instead of placing the edging 60 in a mold, like the mold 28, in such a manner that the edging 60 reinforces the edge 22 on the panel 14, the edging 60 is placed in the mold in such a manner that it will be molded in place on the inner wall 20 on the panel 14 adjacent to the edge 22, thereby forming a tongue engageable by a groove 62 formed on edge 22 of the panel 12, as shown in FIGURE 5. After the edge members 60 and 62 have been placed in their associated molds, the spacer member 42 is placed into position and the clamps 56 are tightened.

The panel edgings 60 and 62 are each of sufficient length to extend from the lower edges 68 to the upper edges 70 of their associated panels. Each of the edge members 60 and 62 is provided with suitable elongated slots at their upper and lower ends such as the slots shown at 72 in FIGURE 3 for the upper ends 74 of the members 60 and 72. In addition, the inner edge 76 of each edging member 60 and 62 is provided with a pair of parallel, spaced flexible, holding flanges or gripping members 78 which extend for the full length of their associated edging members and which are provided with continuous grooves 80. The gripping members 78 perform the dual function of (1) gripping ridges 82 provided on each housing half 84 of a fully enclosed panel clamp 86 of the type described and claimed in said co-pending application and (2) forming a continuous gripping edge to minimize the likelihood of the members 60 and 62 becoming dislodged from or pulled out of the core 16. The end 87 of each housing half 84 is inserted through a slot 72. This insertion is facilitated by providing the members 78 with undercut portions 88 permitting the members 78 to be sprung to the position shown in FIGURE 7 so that the ridges 82 will readily engage the grooves 80.

The housing halves 84 are inserted into an appropriate slot 72 at the upper and lower ends of the members 60 and 62 before they are inserted into the mold 28, thereby retaining the housing halves in their correct positions during the molding operation.

Referring now to FIGURE 2, each panel clamp or locking mechanism 86 includes the housing halves 84 as aforesaid. Each housing half includes a bottom wall 92, an encompassing side wall 94 and an open top 96 which is formed in the end 87. The bottom wall 92 is both wider and longer than the remaining portion of its associated housing half, thereby forming a bracket 98 which reinforces the grip of the core 16 on the housing 84. A plurality of thin, web-like members 100 (FIGURES 4–7 and 9) connect the bracket 98 to its associated side wall 94. The locking mechanism 86 also includes a rotatably driven member 102, a locking member 104 and a boss or journal 106, all as more fully described in said copending application. The opening formed in the side wall 94 by the journal 106 may be closed by a cylindrical member 108 (FIGURES 4 and 5) in the manner described in said copending application.

After the assemblies comprising the edging member 60 and 62 and associated housing halves 84 have been placed in position within the mold 28 and the panels 30 have been tightly clamped to the spacer member 42 by the clamps 56, a suitable formable liquid, such as a polyurethane, may be injected into the mold 28 through the aperture 52. As is well known in the art, such material forms and generates gas during the curing stage. This creates considerable pressure which is resisted by the 2 x 4 reinforcing members 38. Gas generated by the curing process is released to atmospheres through the aperture 54 while the foam is expanding into a solid mass about the housing 84 and the gripping members or flanges 78 which firmly anchor the housing 84 in position during the curing process. The flanges 78 also form a permanent bond with the cured core 16 resisting dislodgement of the members 60 and 62 from their associated panel edges.

The housing 84 may also be used with the prior art form of a panel edging member shown in FIGURE 10. This panel edging member is shown in the form of an extruded molding 60a which is preferably made from rigid material such as an aluminum extrusion having edges or flanges 64a engageable in vertical slots 110 provided on the inner surface 32a of a form 28a. The molding 60a is provided with suitable flanges, such as the one shown at 112, for locating and supporting the housing 84 by engaging it through its open top 87 to secure it in position within the mold 28a. After the core 16 has cured sufficiently, the member molding may be stripped away when the mold 28a is disassembled leaving the housing 84 permanently encased within the core 16.

The mold 28a may include the permanent magnets 36 previously described which retain the skin members 24 in position during the molding operation. The finished panel 12a will be identical to the panels 12 except that the edge 22a will not include the molding 60a as a permanent part thereof.

While the particular panel edging members and locking mechanism herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. Edging means for a first panel section having a joining edge surface and panel locking means mounted in said joining edge at said surface of said first panel section, said edging means comprising:
   a molding member secured to said joining surface of said first panel section, said molding member being engageable with the joining surface of a second panel section to form a junction between said panels, said molding member being provided with an elongated slot embracing with said panel locking means to affix said molding member to said locking means, said molding member including spaced parallel gripping means straddling said slot and gripping the sides of said panel locking means.

2. An edging means as defined in claim 1 wherein said panel locking means includes ribs on the sides thereof and wherein said gripping means is provided with grooves engaging with said ribs.

3. In combination, panel edging means for a first panel section having a first joining edge surface and panel locking means mounted in said first joining edge at said surface, said edging means and said panel locking means comprising:
   a molding member secured to said first joining surface, said molding member being engageable with the joining surface of a second panel section to form a junction between said panels, said molding member being provided with an elongated slot embracing with said panel locking means to affix said molding member to said locking means; and
   a housing for said panel locking means, said housing having an end portion engaged in and embraced and held by said slot.

4. A combination as stated in claim 3 wherein said molding member includes spaced, parallel gripping means straddling said slot and gripping the sides of said housing.

5. A combination as stated in claim 4 wherein said housing includes ribs on the sides thereof and wherein said gripping means is provided with grooves engaged with said ribs.

6. In a first panel section having a joining surface, the combination comprising:
   edging means affixed to said joining surface of said first panel section, said edging means being engageable with the joining surface of a second panel section to form a junction between said panels, said edging means being provided with an elongated slot and including spaced, parallel gripping means straddling said elongated slot; and
   panel locking means mounted in said first panel section, said panel locking means having a housing engaged in said elongated slot, said gripping means being embedded in said first panel section and engaging said housing.

7. The combination of claim 6 wherein said housing includes a pair of ribs and said gripping means is provided with grooves engageable with said ribs.

8. The combination of claim 6 wherein said first panel section is molded with said housing and said gripping means become embedded therein.

9. The combination of claim 8 wherein said edging means includes flange means embedded in said panel.

10. A molded wall panel, comprising:
   a core formed by solidifying a flowable material in a mold, said core including first and second joining edges adapted to abut associated joining edges on adjacent panels to form a wall;
   a first panel edging device molded into said first joining edge, said first edging device being provided with a first pair of elongated slots and including an inner edge having a first pair of spaced, parallel, flexible gripping members extending along the major axis of said inner edge of said first edging device and along opposite sides of said first pair of slots for forming a continuous gripping engagement with said first joining edge, said first panel edging device including an outer edge forming tongue means engageable with groove means on an abutting joining edge of an adjacent panel;
   a second panel edging device molded into said second joining edge, said second edging device being provided with a second pair of elongated slots and including an inner edge having a second pair of spaced, parallel, flexible gripping members extending along the major axis of said inner edge of said second edging device and along opposite sides of said second pair of slots for forming a continuous gripping engagement with said second joining edge, said second panel edging device including an outer edge forming groove means engageable by tongue means on an abutting joining edge of an adjacent panel;
   first and second panel locking means molded into one of said joining edges and being engageable with latch means molded into a joining edge on an adjacent panel, each of said locking means including first housing means engaged in one of said first pair of slots and engaged by one of said pair of gripping members to support said locking mechanism in a mold during the molding of said core; and
   first and second panel latch means molded into another of said joining edges and being engageable by locking means molded into a joining edge on an adjacent panel, each of said latch means including second housing means engaged in another of said pair of slots and engaged by the other of said pair of gripping members to support said latch means in a mold during the molding of said core.

11. A wall panel as defined in claim 10 wherein each of said housing means includes flange means molded into its associated joining edge.

12. A panel as defined in claim 10 including skin means extending along each side of said core between said edges, said skin means including portions extending at right angles to said surfaces into said edges and wherein said edging devices each include flange means underlying said extending portions of said skin means.

References Cited

UNITED STATES PATENTS

| 2,647,287 | 8/1953 | Jones | 52—582 |
| 2,982,380 | 5/1961 | Rose | 52—578 |

HENRY C. SUTHERLAND, *Primary Examiner.*

ALFRED C. PERHAM, *Examiner.*

G. W. HORNADAY, *Assistant Examiner.*